United States Patent [19]

Fujiwara

[11] Patent Number: 5,125,082
[45] Date of Patent: Jun. 23, 1992

[54] MANAGEMENT SYSTEM CAPABLE OF QUICKLY ASSIGNING A TERMINAL ENDPOINT IDENTIFIER TO A TERMINAL EQUIPMENT UNIT

[75] Inventor: Ryuhei Fujiwara, Tokyo, Japan
[73] Assignee: NEC Corporation, Tokyo, Japan
[21] Appl. No.: 367,180
[22] Filed: Jun. 16, 1989

[30] Foreign Application Priority Data

Jun. 16, 1988 [JP]  Japan .................. 63-146987

[51] Int. Cl.$^5$ .......... G06F 7/02; H03K 5/22; H08J 3/02
[52] U.S. Cl. ................ 395/325; 370/110.1; 364/242.94; 364/251.3
[58] Field of Search ... 364/900 MS File, 200 MS File; 370/110.1, 16; 395/325, 200, 900; 371/20.1, 25.1, 67.1, 68.2

[56] References Cited

U.S. PATENT DOCUMENTS

| | | | |
|---|---|---|---|
| 4,546,467 | 10/1985 | Yamumoto | 371/20.4 |
| 4,625,314 | 11/1986 | Witte | 371/68.2 |
| 4,688,214 | 8/1987 | DeWitt et al. | 370/110.1 |
| 4,707,832 | 11/1987 | Glenn et al. | 370/110.1 |
| 4,722,082 | 1/1988 | Furuya et al. | 370/110.1 |
| 4,730,313 | 3/1988 | Stephenson et al. | 370/110.1 |
| 4,789,986 | 12/1988 | Koizumi et al. | 371/67.1 |
| 4,845,710 | 7/1989 | Nakamura et al. | 370/110.1 |
| 4,947,391 | 8/1990 | Schwarz et al. | 370/110.1 |
| 4,961,180 | 10/1990 | Schwarz et al. | 370/110.1 |

Primary Examiner—Michael R. Fleming
Assistant Examiner—Ayaz R. Sheikh
Attorney, Agent, or Firm—Sughrue, Mion, Zinn, Macpeak & Seas

[57] ABSTRACT

In a management system for managing a plurality of terminal endpoint identifiers which are to be assigned to terminal equipment units, an up-down counter is selectively operable in a count-up mode and a count-down mode to count the number of the terminal equipment units which are currently practically connected to the management system and to produce a count signal and to which the terminal endpoint identifiers are assigned, respectively. A read-only memory memorizes a first threshold value and a second threshold value greater than the first threshold value. A comparator compares the count signal with the first threshold value to produce a coincidence signal when the count signal is coincident with the first threshold value. On production of the coincidence signal, the terminal equipments to which the terminal endpoint identifiers are assigned are monitored by a central processing unit to judge whether or not the terminal equipments in question are actually connected to the management system. The first threshold value is changed to the second threshold value under control of a central processing unit in response to the coincidence signal.

3 Claims, 3 Drawing Sheets

MANAGEMENT SYSTEM CAPABLE OF QUICKLY ASSIGNING A TERMINAL ENDPOINT IDENTIFIER TO A TERMINAL EQUIPMENT UNIT

BACKGROUND OF THE INVENTION

This invention relates to a management system for use in an integrated services digital network (ISDN) to manage a plurality of terminal endpoint identifiers (TEI) which are assigned to a plurality of terminal equipment (TE) units.

An integrated services digital network of the type described comprises a digital exchange connected to a plurality of network termination (NT) units through digital subscriber lines. To each of the network termination units, a subscriber bus or another network termination unit is extended to at least one socket element. Each socket can be used in common to different kinds of terminal equipment (TE) units, such as a telephone, a personal computer, a facsimile device, or the like. With this structure, each user communicate with other devic through the integrated services digital network by selectively connecting each of the terminal equipment units to the socket. Such communication is carried out by the use of a pair of information transfer channels or communication channels (called B-channels) and a control channel (called D-channel) which are multiplexed in a time division fashion. Thus, it is possible to favorably offer a wide variety of services to the users.

In order to enable the above-mentioned communication of various kinds of terminal equipment units, a protocol is prescribed in connection with an interface between users and such an integrated services digital network by recommendations of International Telegraph and Telephone Consultative Communication (CCITT). More specifically, a protocol for such an interface is hierarchically divided into first, second, and third layer protocols which define a procedure between terminal equipment units and network termination (NT) units, a procedure for a D-channel link access, and a procedure for call control from a beginning of communication to an end thereof, respectively.

The following description will be primarily directed to the protocol for the second layer protocol, which is determined for accessing a link on the D-channel and which may be called a link access procedure on the D-channel (LAPD). Inasmuch as various kinds of the terminal equipment units can be selectively connected to a single socket in the integrated services digital network, it is necessary to identify whether or not such a terminal equipment unit is connected to the socket each time when communication is carried out throught the socket.

According to the link access procedure on the D-channel (LAPD), when a selected one of the terminal equipment units is connected to the socket and is powered on to access the integrated services digital network and to set up a data link between the selected terminal equipment unit and the integrated services digital network, a request is at first issued from the selected terminal equipment unit to the integrated services digital network. Responsive to the request, the integrated services digital network searches for an unused or idle one of terminal endpoint identifiers (TEI) managed by the integrated services digital network and assigns the unused terminal endpoint identifier to the selected terminal equipment unit with the assigned terminal endpoint identifier retained or registered in the integrated services digital network.

Thus, an unused terminal endpoint identifier is preferentially assigned to each terminal equipment unit each time when the integrated services digital network is accessed. As a result, assigned terminal endpoint identifiers are successively registered on a registration table of the integrated services digital network.

Herein, it is to be noted that such assigned terminal endpoint identifiers are not eliminated from the registration table even when the terminal equipment unit is disconnected from the integrated services digital network after completion of communication. Under the circumstances, let a following one of the terminal equipment units issue a following or new request of assigning or granting a terminal endpoint identifier on condition that no unused terminal endpoint identifier remains in the integrated services digital network. In this event, the integrated services digital network manages and checks whether or not all of the terminal equipment units have been actually connected to the integrated services digital network. Specifically, if a certain one of the terminal equipment units is disconnected from the integrated services digital network, the integrated services digital network assigns, to the following terminal equipment unit, a terminal endpoint identifier which was previously assigned to the certain terminal equipment unit. On the other hand, when the certain terminal equipment unit has been connected to the integrated services digital network, a similar checking operation is carried out with regards to a different one of the terminal endpoint identifiers and is successively continued until an idle terminal endpoint identifier is found by the integrated services digital network. At any rate, the checking operation must be prosecuted in accordance with a terminal endpoint identifier assignment procedure prescribed in the CCITT I.441.

From this fact, it is readily understood that the integrated services digital network has a variable response time to a request of assigning or granting a terminal equipment identifier. Accordingly, a long time is wasted to set up a data link.

SUMMARY OF THE INVENTION

It is an object of this invention to provide a management system which is capable of quickly setting up a data link in an integrated services digital network.

It is another object of this invention to provide a management system of the type described, wherein an idle terminal endpoint identifier is quickly assigned to each terminal equipment unit.

It is still another object of this invention to provide a management system of the type described, wherein the checking operation in accordance with a terminal endpoint identifier assignment procedure prescribed in the CCITT I.441 is unnecessary.

A management system to which this invention is applicable is for use in managing a plurality of terminal endpoint identifiers which are to be selectively and variably assigned to terminal equipment units connected to an integrated services digital network. According to this invention, the management system has up-down counter means operable in response to a count mode signal representative of a selected one of a count-up and a count-down mode and to a sequence of count pulses for counting the count pulses to produce a count signal representative of a count value to which the count pulses are counted by said up-down counter means, memory means for memorizing a threshold value signal representative of a predetermined threshold value, comparing means responsive to the count signal and the threshold value signal for comparing the count value with the predetermined threshold value to detect whether or not the count value is not smaller than the predetermined threshold value and to thereby produce a comparison signal when the count value is not smaller than the threshold value, and operation control means operatively coupled to the comparing means, the up-down counter means, and the terminal equipment units for controlling the up-down counter means and the terminal equipment units. Such control operation is carried out by sending, in response to the comparison signal, a check request to assigned terminal equipment units to which the terminal endpoint identifiers are individually assigned, by receiving individual responses to the check request, by releasing non-reception terminal equipment units from which no response is received in the assigned terminal equipment units, and by producing a count down signal representative of the count-down mode and internal clock pulses equal in number to the non-reception terminal equipment units. The management system further comprises means for delivering the count down signal and the internal clock pulses to the up-down counter means as the count mode signal representative of the count-down mode and the count pulses, respectively.

DESCRIPTION OF THE PREFERRED EMBODIMENT

Figure 1:
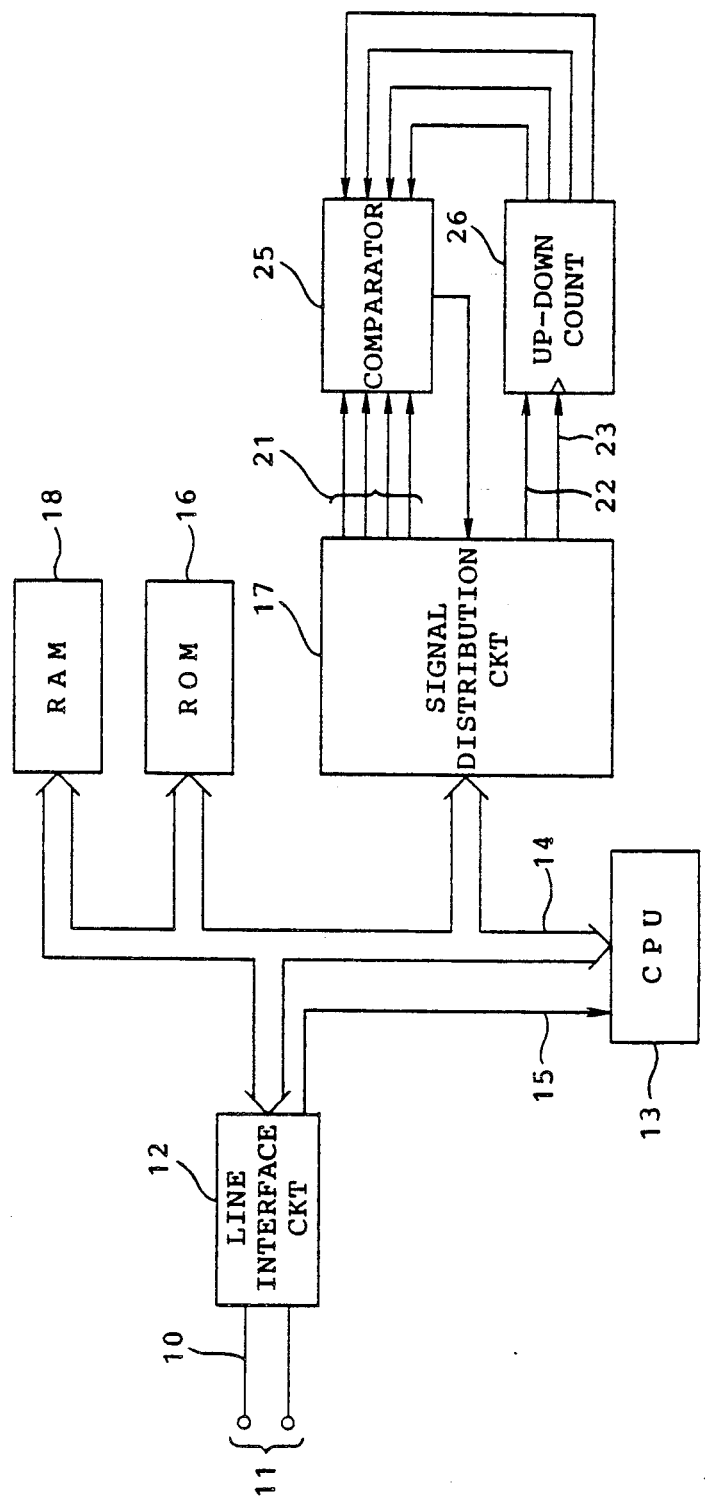
FIG. 1 is a block diagram of a management system according to a preferred embodiment of this invention.

Referring to FIG. 1, an integrated services digital network is specified by an exchange which is operable to manage terminal endpoint identifiers in accordance with this invention and which may therefore be called a management system according to a preferred embodiment of this invention. The illustrated exchange accommodates a plurality of subscriber lines, each represented by a two-wire line 10 connected to a pair of subscriber terminals 11. The subscriber terminals 11 may be connected either to a network termination (NT) unit (not shown) or to a terminal equipment (TE) unit (not shown). Each terminal equipment unit is assigned with a terminal endpoint identifier (TEI) when it is connected to each subscriber line.

The illustrated exchange comprises a line interface circuit 12 connected to the subscriber lines, such as 10, and a central processing unit (CPU) 13 connected to the line interface circuit 12 through a data/address bus 14 and an interruption line 15. The line interface circuit 12 comprises a hybrid transformer (not shown in this figure) for transformation between the two-wire line 10 and a four-wire line (not shown in this figure), as will later be described. At any rate, it suffices to say that the illustrated line interface circuit 12 acts as a hardware interface for serial/parallel data conversion, driving each subscriber line, or the like in a manner to be described later.

To the data/address bus 14 are connected a read-only memory (ROM) 16, a signal distribution circuit 17, and a random access memory 18. The signal distribution circuit 17 has an input port connected to the data/address bus 14, a first output port 21, a second output port 22, and a third output port 23. The first output port 21 is composed of a plurality of output terminals connected to a comparator 25. The second and the third output ports 22 and 23 are connected to an up-down counter 26 which is selectively operable in a count-up mode and a count-down mode. To this end, the up-down counter 26 has a mode terminal (depicted at D/U) connected to the second output port 22 of the signal distribution circuit 17 and a count terminal (depicted at a triangle) connected to the third output port 23 of the signal distribution circuit 17. From this fact, it is readily understood that the signal distribution circuit 17 supplies the up-down counter 26 with a mode signal representative of either the count-up mode or the count-down mode through the second output port 22 and with a sequence of count pulses through the third output port 23. The up-down counter 26 supplies the comparator 25 with a count signal representative of a count value by counting the clock pulses. In the example being illustrated, the up-down counter 17 is put into the count-up mode and the count-down mode in response to the mode signal of a logic "1" level and a logic "0" level, respectively. The count pulses are given one at a time from the central processing unit 13 each time when the terminal equipment unit is connected to the subscriber line. As a result, the count signal of the up-down counter 26 is representative of the number of the terminal equipment units which have been actually connected to the exchange.

The read-only memory 16 memorizes a control program for controlling operations of the central processing unit 13. In the illustrated example, the read-only memory 16 further memorizes a maximum value signal and a plurality of threshold value signals representative of a plurality of threshold values, respectively, which are different from one another, and which include a minimum threshold value and a maximum threshold value. The maximum value signal indicates a maximum value of the terminal endpoint identifiers that can be managed or monitored by the central processing unit 13 and that may be equal to 126. On the other hand, the maximum threshold value is smaller than the maximum value.

For brevity of description, it will be assumed that the illustrated read-only memory 16 memorizes only first and second threshold value signals representative of the minimum and the maximum threshold values, respectively.

Figure 2:
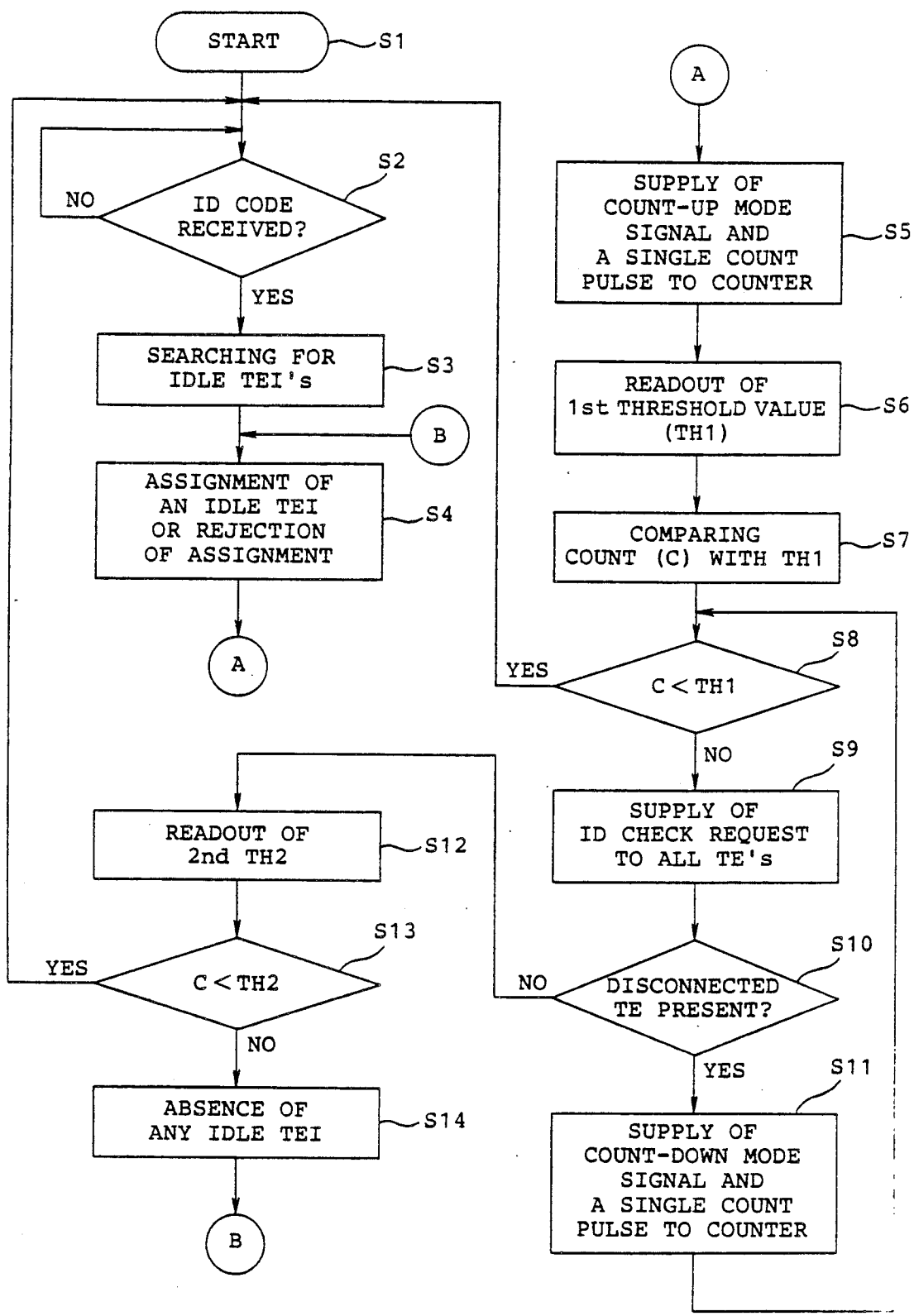
FIG. 2 is a flow chart for use in describing operation of the management system illustrated in FIG. 1.

Referring to FIG. 2 and FIG. 1, let a terminal equipment unit be connected to the subscriber terminals 11 (FIG. 1) and issue an identifier assignment request code (often abbreviated to an ID code) to the line interface circuit 12. In this connection, the terminal equipment unit in question may be referred to as a request terminal equipment unit. Specifically, the identifier assignment request code carries an action indicator and a reference number. As known in the art, the action indicator specifies a predetermined number of 126 in the identifier assignment request code while the reference number is specified by a random number generated within the request terminal equipment unit.

The identifier assignment request code, namely, ID code, is sent from the request terminal equipment unit to the illustrated management system. The management system carries out an operation of assigning a selected one of the terminal endpoint identifiers to the request terminal equipment unit in a manner to be described. In the illustrated example, the identifier assignment request code is delivered to the central processing unit 13 through the line interface circuit 12. An interruption request is sent to the central processing unit 13 through the interruption line 15 when the ID code is received by the line interface circuit 12.

In the management system, the random access memory 18 has a plurality of addresses which correspond to the terminal endpoint identifiers and which store status signals representative of whether the terminal endpoint identifiers are being used or idle. The status signals are assumed to be registered or held in the respective addresses of the random access memory 18. The number of the status signals falls within a range between 64 and 126, both inclusive.

On delivering the terminal endpoint identifiers to the terminal equipment units, each terminal endpoint identifier is practically preceded by a service access point identifier (SAPI) stored in the random access memory 18 also. A combination of the terminal endpoint identifier and the service access point identifier forms a data link connection identifier (DLCI), although description will be omitted about the service access point identifier and the data link connection identifier.

In FIG. 2, the central processing unit 13 starts the operation at a first step S1 and proceeds to a second step S2 of monitoring whether or not an ID code is received by the central processing unit 13 through the interruption line 15. The second step S2 is repeated until reception of any ID code and is followed by a third step S3 of accessing the random access memory 18 to search for an idle one of the terminal equipment identifiers (TEI) when the ID code is received by the central processing unit 13. Inasmuch as the random access memory 18 is loaded with the status signals of the terminal endpoint identifiers, as mentioned before, the central processing unit 13 can detect each status of the terminal equipment identifiers from the status signals. In this connection, it is unnecessary to carry out a check routine which is prescribed by CCITT I.441 to assign the terminal endpoint identifiers to the terminal equipment units, as will later become clear. Accordingly, the central processing unit 13 can quickly judge whether or not an idle terminal endpoint identifier (TEI) is present. As a result, the central processing unit 13 quickly assigns the idle terminal endpoint identifier to the request terminal equipment unit without making use of the check routine, as shown at a fourth step S4, if the idle terminal endpoint identifier is present. Otherwise, the central processing unit 13 rejects assignment of any terminal endpoint identifier to the request terminal equipment unit, as illustrated at the fourth step S4. When the idle terminal endpoint identifier is assigned to the request terminal equipment unit, the idle terminal endpoint identifier is sent from the central processing unit 13 as an identifier assignment code to the request terminal equipment unit through the line interface circuit 12.

In FIG. 2, the fourth step S4 is followed by a fifth step S5 at which the signal distribution circuit 17 is energized by the central processing unit 13. This shows that the signal distribution circuit 17 is energized each time when the identifier assignment code is produced from the central processing unit 13. More specifically, the central processing unit 13 supplies the signal distribution circuit 17 with the mode signal of the logic "1" level representative of the count-down mode and with a single one of the count pulses at the fifth step S5. The mode signal is delivered through the second output port 22 of the signal distribution circuit 17 to the mode terminal D/U of the up-down counter 26 while the single count pulse is delivered through the third output port 23 of the signal distribution circuit 17 to the up/down counter 26. Consequently, the up-down counter 26 is incremented up by one to produce a count signal C representative of a count value to which the count pulses are counted by the up-down counter 26.

At a sixth step S6, the central processing unit 13 accesses the read-only memory 16 to read the first threshold value signal (depicted at TH1 in FIG. 2) out of the read-only memory 16. The first threshold value signal TH1 is sent through the first output port 21 to the comparator 25. The count signal C is compared with the first threshold value signal TH1 by the comparator 25 at a seventh step S7.

It is to be noted that an idle terminal endpoint identifier remains when the count signal C represents the count value smaller than the first threshold value. Under the circumstances, if the count value is smaller than the first threshold value, the comparator 25 produces an incoincidence signal of the logic "0" level at an eighth step S8. The incoincidence signal is supplied through the signal distribution circuit 17 to the central processing unit 13. Responsive to the incoincidence signal, the central processing unit 13 executes the second step S2 to monitor reception of a following one of the ID codes.

On the other hand, no idle terminal endpoint identifier is left when the count value is equal to or greater than the first threshold value, so far as the status signals are concerned. Therefore, if the comparator 25 judges that the count value is not smaller than the first threshold value and produces a coincidence signal of a the logic "1" level, a ninth step S9 follows the eighth step S8 to supply an identifier check request code to every one of the terminal equipment units that correspond to the terminal endpoint identifiers currently registered in the random access memory 18 and that may be referred to as registered terminal equipment units. The coincidence signal may be called a comparison signal.

It is to be noted that the registered terminal equipment units may not always actually be connected to the subscriber lines but may be disconnected from the subscriber lines.

At a tenth step S10, the central processing unit 13 monitors whether or not each of the registered terminal equipment units is disconnected from the subscriber lines. To this end, the illustrated central processing unit 13 checks whether or not a response code to the identifier check request code is transmitted from every one of the registered terminal equipment units and received by the central processing unit 13. Such a response code may be called an identifier response code and is supplied from each of the registered terminal equipment units only when the registered terminal equipment units are being connected to the subscriber lines or the management system.

From this fact, it is readily understood that 25 the registered terminal equipment units may be regarded as being disconnected from the management system or as an inactive terminal equipment unit when no identifier response code is transmitted therefrom.

If such an inactive terminal equipment unit is present, the central processing unit 13 executes an eleventh step S11 after the tenth step S10. Otherwise, the tenth step S10 is followed by a twelfth step S12. At the eleventh step S11, the central processing unit 13 rewrites the status signal of the random access memory 18 at an address assigned to the inactive terminal equipment unit 5 and supplies the up-down counter 26 with the mode signal representative of the count-down mode and with a single one of the count pulses through the signal distribution circuit 17. Consequently, the up-down counter 25 is incremented down by one. Thereafter, processing is returned back to the eighth step S8.

When all of the registered terminal equipment units are connected to the management system, the central processing unit 13 accesses the read-only memory 16 at the twelfth step S12 to read the second threshold value signal (depicted at TH2) therefrom. The second threshold value signal TH2 is sent through the signal distribution circuit 17 to the comparator 25 and is compared at a thirteenth step S13 with the count value represented by the count signal supplied from the up-down counter 26. The second threshold value signal TH2 is representative of the second threshold value greater than the first threshold value, as mentioned before. When the comparator 25 judges that the count value C is smaller than the second threshold value (TH2), the thirteenth step S13 is returned back to the second step S2. Otherwise, the thirteenth step S13 is followed by a fourteenth step S14 at which the central processing unit 13 recognizes absence of any idle terminal endpoint identifiers. Subsequently, the fourteenth step S14 is followed by the fourth step S4 to reject assignment of a terminal endpoint identifier.

With this structure, the central processing unit 13 can quickly detect presence or absence of an idle terminal endpoint identifier by searching for the random access memory 18.

In addition, the threshold values are successively changed from a small one to a large one. Accordingly, the central processing unit 13 may not monitor all the status signals of the terminal endpoint identifiers. Therefore, it is possible to respond to the ID code at a high speed.

Thus, a combination of the central processing unit 13 and the line interface circuit 12 serves to control the up-down counter 26 and the signal distribution circuit 17 in cooperation with the terminal equipment units and may be collectively called an operation control circuit for controlling the up-down counter 26 and the terminal equipment units. In addition, the comparator 25 and the signal distribution circuit 17 may be collectively called a comparator circuit.

Figure 3:
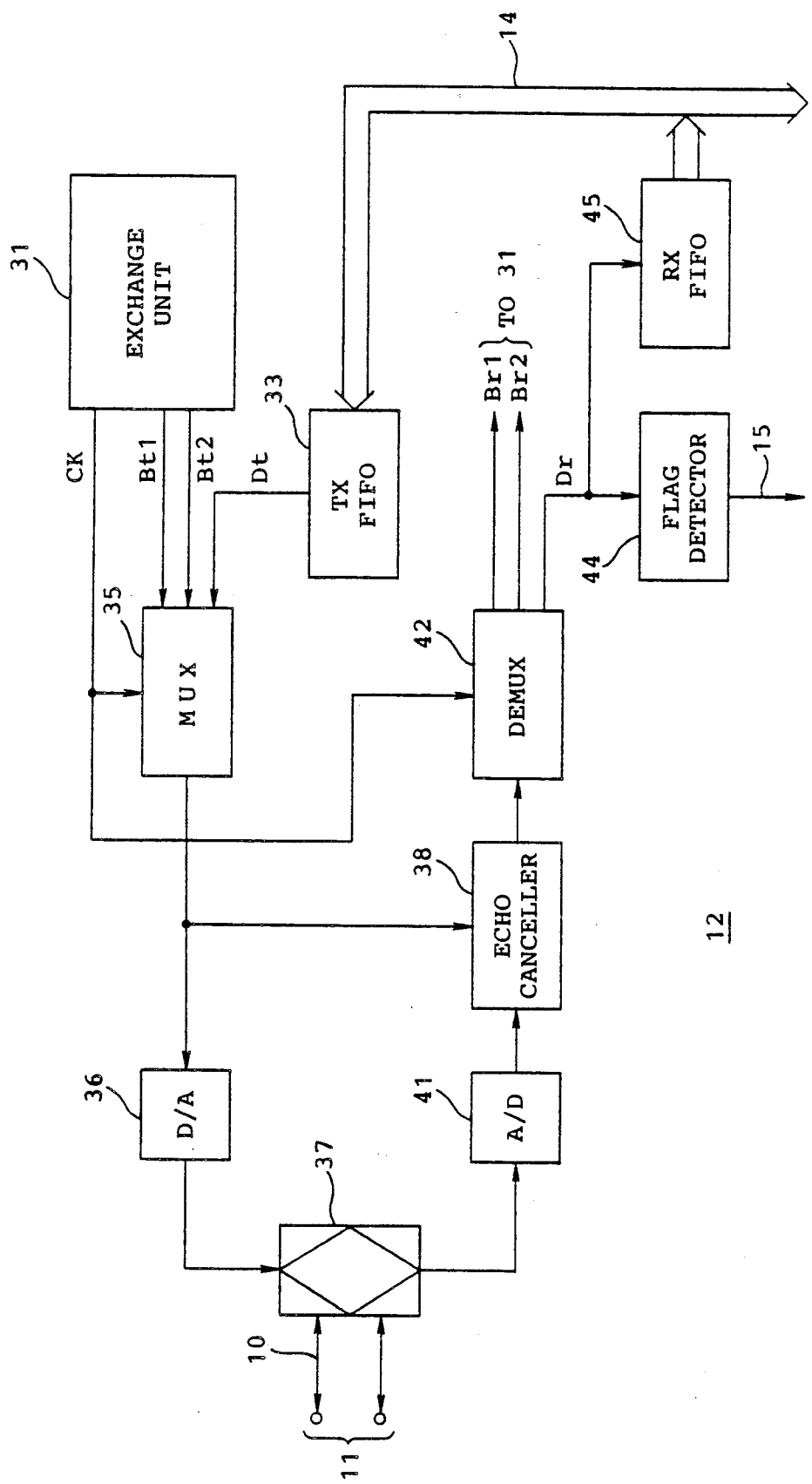
FIG. 3 is a block diagram of a part of the management system illustrated in FIG. 1.

Referring to FIG. 3 together with FIG. 1, the line interface circuit 12 is operable in cooperation with an exchange unit 31 which is included in the exchange and which comprises a clock generator, a switch section, and a switch controller. It is assumed that the clock generator of the exchange unit 31 supplies a sequence of clock pulses CK to the line interface circuit 12. A sequence of transmission data signals is supplied from the switch section of the exchange unit 31 to the line interface circuit 12 through a pair of transmission communication channels Bt1 and Bt2. On the other hand, a sequence of reception data signals is sent from the line interface circuit 12 to the switch section of the exchange unit 31 through a pair of reception communication channels Br1 and Br2.

The illustrated line interface circuit 12 comprises a transmission first-in first-out memory (TX FIFO) 33 controlled by the central processing unit (CPU) 13 (FIG. 1) through the data/address bus 14 so as to assign a transmission control channel Dt to the line interface circuit 12. The transmission control channel Dt serves to transmit a transmission control signal which is successively supplied from the central processing unit 13 to the TX FIFO 33. A multiplexer (MUX) 35 is supplied with the transmission data signals and the transmission control signal successively read out of the TX FIFO 33 through the transmission communication channels Bt1 and Bt2 and the transmission control channel Dt. At any rate, a sequence of multiplexed digital signals is produced from the multiplexer 35 in accordance with a predetermined format. The multiplexed digital signal sequence is supplied through a digital to analog converter 36 to a hybrid transformer 37 on one hand and to an echo canceller 38 on the other hand. As a result, the multiplexed digital signal sequence is sent from the hybrid transformer 37 to the two-wire line 10 in the form of a transmission voltage signal.

On the other hand, a reception voltage signal is delivered from the two-wire line 10 to an analog to digital converter 41 through the hybrid transformer 37 in the form of a sequence of reception digital signals. The reception digital signal sequence is sent to the echo canceller 38 to remove a near end noise and is thereafter supplied to a demultiplexer (DEMUX) 42 operable in response to the clock pulse sequence CK. Consequently, the demultiplexer 42 demultiplexes the reception digital signal sequence into the reception data signals and a reception control signal sent through the reception communication channels Br1 and Br2 and a reception control channel Dr, respectively. The reception control signal may carry flags placed at a start portion and an end portion. Supplied with the reception control signal, a flag detector 44 detects the flags to send the interruption request to the central processing unit 13 through the interruption line 15 when the flag is detected at the end of the reception control signal. The remaining reception control signal between the flags is delivered to a reception first-in first-out memory (RX FIFO) 45. Responsive to the interruption request, the central processing unit 13 accesses the RX FIFO 45 to successively read the reception control signal.

While this invention has thus far been described in conjunction with a preferred embodiment thereof, it will readily be possible for those skilled in the art to put this invention into practice in various other manners. For example, three or more different threshold values may be memorized in the read-only memory 16 to be changed from a minimum one to a maximum one. Practically, operations of the signal distribution circuit 17, the comparator 25, and the up-down counter 26 may be implemented by the use of a microprocessor by software. In addition, the random access memory 18 may be loaded with the terminal endpoint identifiers connected to the management system instead of the status signals corresponding to the terminal endpoint identifiers.

What is claimed is:

1. A management system for use in managing a plurality of terminal endpoint identifiers which are to be selectively and variably assigned to terminal equipment units connected to an integrated services digital network through data links and which identify the data links between the terminal equipment units and the integrated service digital network, said management system comprising:

up-down counter means responsive to a count mode signal representative of a selected one of a count-up and a count-down mode said counter means also being responsive to a sequence of count pulses, so as to count said count pulses to produce a count signal representative of a count value;

memory means for storing a threshold value signal representative of a predetermined threshold value;

comparing means responsive to said count signal and said threshold value signal for comparing said count value with said predetermined threshold value and to thereby produce a comparison signal when said count value is equal to or greater than said threshold value;

operation control means cooperating with said comparing means, said up-down counter means, and said terminal equipment units for controlling said up-down counter means and said terminal equipment units by sending, in response to said comparison signal, a check request to the terminal equipment units all of which are connected to said network and to which said terminal endpoint identifiers are assigned, by monitoring whether or not each response to said check request is received from each of the last-mentioned terminal equipment units, to determine, as non-reception terminal equipment units, the terminal equipment units from which no response is received, and by producing internal clock pulses equal in number to said non-reception terminal equipment units and a count down signal representative of said count-down mode; and means for delivering said count down signal and said internal clock pulses to said up-down counter means and said sequence of the count pulses, respectively.

2. A management system as claimed in claim 1, wherein said operation control means produces the count mode signal representative of said count-up mode and said internal clock pulses each time when said terminal endpoint identifiers are assigned to said terminal equipment units one at a time.

3. A management system as claimed in claim 1, wherein said memory means stores an additional threshold value signal representative of an additional threshold value greater than said predetermined threshold value;

said operation control means accessing said memory means to change said predetermined threshold value to said additional threshold value when said individual response are received from all of said assigned terminal equipment units.

* * * * *